May 18, 1926.
H. VAN DER HOF
STEERING DEVICE FOR TRAILERS
Filed March 20, 1924
1,585,133
Fig: 1.
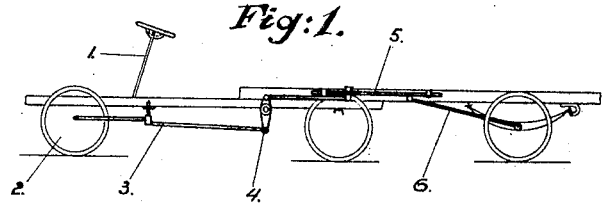
Fig: 2.
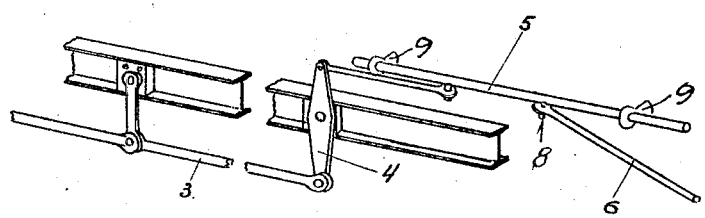
Fig: 3.
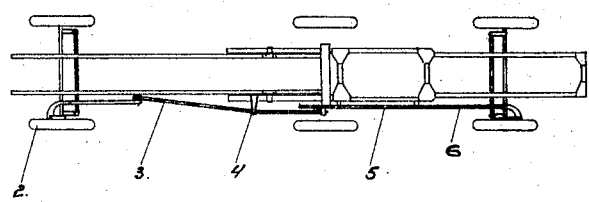
Fig: 4.
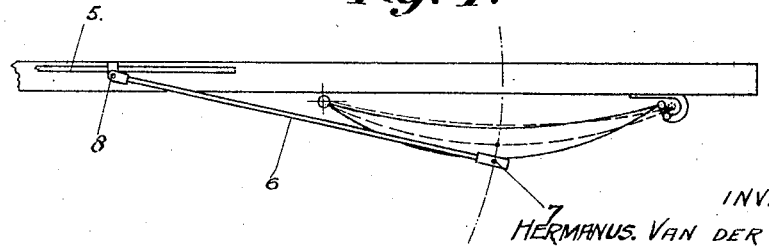
INVENTOR
HERMANUS VAN DER HOF
BY Richards & Geier
ATTORNEYS Patented May 18, 1926.

1,585,133

UNITED STATES PATENT OFFICE.

HERMANUS van der HOF, OF AMSTERDAM, NETHERLANDS, ASSIGNOR TO NAAMLOOZE VENNOOTSCHAP INTERNATIONALE TRUCK & TRAILER COMPAGNIE (INTERNATIONALE VRACHT-EN AANHANGWAGEN MAATSCHAPPIJ), OF AMSTERDAM, NETHERLANDS.

STEERING DEVICE FOR TRAILERS.

Application filed March 20, 1924. Serial No. 700,539.

This invention relates to the steering mechanism of traction vehicles with a two-wheeled trailer hinged to the tractor vehicle, the trailer wheels being steered together with the steering wheels of the tractor vehicle, and the steering movement being transferred from the steering wheels by means of a coupling bar and a two-armed lever. Practice has shown that the trailer wheels are undesirably displaced by the bending of the springs, which carry the axle of the trailer.

The object of the invention is to provide an improvement of said steering mechanism.

In steering mechanism of the type described made in accordance with this invention the double lever transfers the movement of the steering wheels directly or indirectly to a bar, which is displaceable in or approximately in its direction of length. To said bar is hinged the steering bar which moves the trailer wheels. This construction makes it possible to give the bar, which moves the trailer wheels, such a length, that the bending of the springs by the loaded trailer, which displaces the axle of the trailer in the rearward direction has no undesirable influence on the position of the trailer wheels. The wheels of the trailer of this kind of vehicle are placed on an axle, which is supported by flat springs. Said springs are hinged at the front side to the frame of the vehicle and the rear end of the springs is connected to a link. The axle of the trailer can therefore only move rearwardly on loading the trailer. The displacement of the axle has, by the construction according to the invention, the result, that the bar which steers the trailer wheels is merely turned about the point at which it is hinged to the bar, which is displaceable in its length direction; this turning does not result in undesirable displacement of the trailer wheels.

The annexed drawings illustrate by way of example one form of device made in accordance with this invention.

Fig. 1 is a side view of a tractor-vehicle with trailer provided with the steering mechanism.

Fig. 2 is a perspective view of the steering mechanism.

Fig. 3 is a plan view of Figure 1 and

Fig. 4 is a diagrammatical view of a part of the steering mechanism on a larger scale.

By means of the handwheel 1 the steering wheels 2 are steered in the usual manner, whereby at the same time the bar 3 moves the double lever 4. A bar 5 which is disposed so as to be displaceable only in the direction of its length, is mounted for such movement in fixed guides 9 and is hinged to an actuating bar interposed between said bar 5 and one arm of the double lever 4. To said bar 5 the steering bar 6, for the trailer wheels, is hinged. The bar 6 turns the trailer wheels in an opposite direction to the steering wheels of the motor vehicle. The length of the bar 6 is so chosen, that on displacement of the connection point 7 of the bar 6 with the steering apparatus of the trailer wheel, when the trailer is loaded, said point will describe a relatively flat arc and the bar 6 will turn freely about its hinge 8.

What I claim is:

1. A steering mechanism for traction vehicles with trailers including, in combination, a steering mechanism for the wheels of the vehicle, a steering mechanism for the trailer axle, a lever pivotally connected to the frame of the vehicle and to the steering mechanism thereof, a bar connected to one end of said lever and movable in the direction of its length, and a steering bar connected at one end to the steering mechanism of the trailer axle, said steering bar being of such a length that the movement of the rear end thereof caused by the displacement of the trailer axle when the trailer is being loaded, will be in an arc having a relatively flat curvature.

2. A steering mechanism for traction vehicles with trailers including, having in combination steering mechanism for the wheels of the vehicle, a lever pivoted intermediate its ends to the frame of the vehicle and pivotally connected at one end to the steering mechanism thereof, a bar displaceable only in the direction of its length movable in fixed guides, an actuating bar hinged at one end to said longitudinally movable bar, and at the other end to the other end of said lever, and a steering bar connected at one end with the trailer wheels and pivotally connected at the other end with said longitudinally movable bar.

3. A steering mechanism for traction vehicles with trailers, including, in combination, a steering mechanism for the wheels of the vehicle, a steering mechanism for the trailer axle, a lever pivotally connected to the frame of the vehicle and to the steering mechanism thereof, a steering bar connected at one end to the steering mechanism of the trailer axle, and a movable bar transmitting the movement of one end of said lever to said steering bar, the latter bar being of such length that the movement of the rear end thereof caused by the displacement of the trailer axle when the trailer is being loaded will be in an arc having a relatively flat curvature.

In testimony whereof I have hereunto set my hand.

HERMANUS van der HOF.